United States Patent [19]

Sawada

[11] 4,369,521

[45] Jan. 18, 1983

[54] RADIO RECEIVING APPARATUS USING HEADPHONE CONNECTOR CABLE AS AN ANTENNA

[75] Inventor: Takeshi Sawada, Tokyo, Japan
[73] Assignee: Sony Corporation, Tokyo, Japan
[21] Appl. No.: 273,963
[22] Filed: Jun. 15, 1981

[30] Foreign Application Priority Data

Jun. 26, 1980 [JP] Japan .................................. 55-89932[U]

[51] Int. Cl.$^3$ ........................ H04B 1/06; H04H 5/00
[52] U.S. Cl. .................................. 455/270; 455/351; 343/702; 179/1 GC
[58] Field of Search ...................... 455/269, 270, 351; 343/702; 179/1 GD, 156 R, 1 G, 1 GC

[56] References Cited

U.S. PATENT DOCUMENTS 2,535,063 12/1950 Halstead ............................ 455/270
2,573,438 10/1951 Hathaway et al. ................. 455/270
2,899,549 8/1959 Potter ................................ 455/269

*Primary Examiner*—Jin F. Ng
*Attorney, Agent, or Firm*—Lewis H. Eslinger; Alvin Sinderbrand

[57] ABSTRACT

Radio receiving apparatus having a receiving unit including an RF stage and a signal processing state, the latter producing an audio frequency signal in response to the RF signal supplied to the RF stage. The receiving unit also includes a jack having at least first and second contacts, the first contact being supplied with the audio frequency signal and the second contact being coupled to a reference potential by impedance means which presents a relatively high impedance to a RF signal. Headphones are connectable to the receiving unit by conducting leads which terminate in a plug that is insertable into the jack. The plug has at least two conductive portions which, when the plug is inserted into the jack, connect to the first and second jack contacts, respectively. The conducting leads which connect the headphones to the plug include at least one signal carrying lead which is connected to the conductive portion of the plug which is connected to the first jack contact and which receives the audio signal. The conducting leads further include at least one shield lead disposed in shielding relationship with respect to the signal carrying lead, the shield lead being connected to the other conductive portion of the plug and being adapted to pick up radio signals and supply same to the second jack contact. A coupling element, such as a capacitor, couples the second jack contact to the RF stage of the receiving unit, thereby coupling the picked up radio signals thereto.

16 Claims, 3 Drawing Figures

RADIO RECEIVING APPARATUS USING HEADPHONE CONNECTOR CABLE AS AN ANTENNA

BACKGROUND OF THE INVENTION

This invention relates to improved radio receiving apparatus and, more particularly, to such apparatus which includes headphones coupled by a cable to a receiving unit, wherein the cable functions to supply audio signals from the receiving unit to the headphones and also as an antenna to pick up and couple radio signals to the receiving unit.

For proper operation of radio receiving apparatus, and particularly stereophonic radio receivers, it is conventional to connect a radio antenna to the receiving apparatus, at least to the high frequency "front end" section therein. Typically, such as in the environment of a home entertainment system, a relatively large outdoor antenna is coupled by suitable leads, such as coaxial cable, twin line transmission leads, or the like, to the usual radio frequency (RF) stage of the receiving apparatus. Such large antennae are substantially immobile; and the radio receiving apparatus with which they are used are of the so-called stationary type.

Portable radio receivers likewise are provided with antennae. When such receivers are adapted to receive FM broadcast transmissions, and particularly FM stereophonic signals, the antenna that is used therewith typically may be the so-called "rod-antenna". The rod-antenna generally is constructed as a telescoping rod that is pivotally connected to the receiving apparatus and, thus, may be extended and positioned in different directions so as to optimize signal reception. However, the need to adjust the directivity of the rod-antenna in order to improve sensitivity, depending upon different positions and locations of the receiver apparatus, may be troublesome to the operator. Also, when in its extended position, the rod-antenna may interfere with other individuals, may present an obstacle to other property, and may become a relatively dangerous or hazardous instrumentality. Moreover, the rod-antenna may be easily damage or even destroyed.

In relatively compact radio receiving apparatus, the receiving unit may omit the usual loudspeakers; and audio signals may be reproduced for the user by means of headphones, such as stereo headphones. Of course, the headphones are coupled to the receiving unit by a cable such that the audio frequency signals which are produced by the receiving unit in response to incoming radio signals may be coupled to and transduced by the headphones. Typically, a jack/plug connection is provided between the headphone cable and the receiving unit. If a rod-antenna also is provided in the receiving unit, significant interference may occur between that antenna and the headphone cable.

OBJECTS OF THE INVENTION

Therefore, it is an object of the present invention to provide improved radio receiving apparatus which overcomes the aforenoted disadvantages attending antennae used therewith.

Another object of this invention is to provide radio receiving apparatus which is usable with headphones, and wherein the cable by which the headphones are connected to the receiving apparatus also functions as an antenna.

A further object of this invention is to provide portable radio receiving apparatus having a receiving unit coupled by a cable to headphones, the cable being coupled to the receiving unit by a jack/plug arrangement, wherein the cable functions as an antenna to pick up radio signals, and wherein such picked up radio signals are coupled from the plug to the receiving unit.

An additional object of this invention is to provide simple, portable stereophonic radio receiving apparatus which is used with headphones, wherein the cable that is used to connect the headphones to the portable unit also serves as an antenna for that unit.

Various other objects, advantages and features of the present invention will become readily apparent from the ensuing detailed description, and the novel features will be particularly pointed out in the appended claims.

SUMMARY OF THE INVENTION

In accordance with this invention, radio receiving apparatus, such as stereophonic signal receiving apparatus is provided, having a receiving unit coupled by conducting leads to headphones. The receiving unit includes a radio frequency (RF) stage that is supplied with a radio signal, and a signal processing stage, including demodulating circuitry which responds to the supplied RF signal to produce an audio frequency signal. A jack is provided in the receiving unit, having at least a first contact that is supplied with the audio frequency and a second contact that is coupled to a reference potential, such as ground, by an impedance means which presents a relatively high impedance to a radio signal. The conducting leads which are coupled to the headphones are connectable to the jack by a plug which includes at least one conductive portion that connects to the first jack contact so as to receive the audio frequency signals therefrom, and a second conductive portion that is connected to the other jack contact. The headphone conducting leads are comprised of at least one signal carrying lead connected to the first-mentioned conductive portion of the plug so as to couple audio frequency signals to the headphones, and at least one shield lead disposed in shielding relationship with respect to the signal carrying lead and connected to the other conductive portion of the plug. The shield lead picks up radio signals, and these radio signals are coupled from the plug and jack connection to the RF stage of the receiving unit by, for example, a capacitor.

In a preferred embodiment, the demodulating circuitry demodulates stereo left and right channel audio signals from the received radio signal. The jack thus is provided with a pair of movable contacts supplied with the left and right channel audio signals, and a fixed contact connected to the impedance means. The plug preferably includes tip and ring portions which are connectable to the movable contacts of the jack, and a sleeve portion which is connectable to the fixed contact of the jack.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
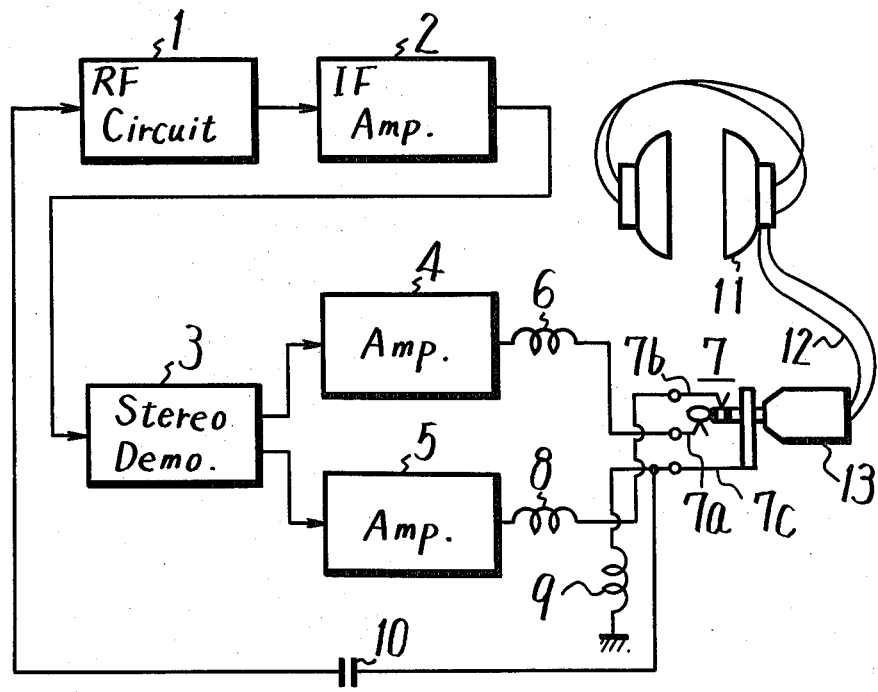
FIG. 1 is a partial block, partial schematic diagram of one embodiment of the present invention.

Referring now to the drawings, and in particular to FIG. 1, there is illustrated one embodiment of the present invention which, for the present discussion, will be assumed to be capable of receiving, demodulating and reproducing stereophonic left and right channel audio signals. The apparatus is comprised of a radio receiving unit adapted to receive radio signals and demodulate same into audio frequency signals, such as stereo left and right channel audio signals. The illustrated apparatus further includes headphones which generate audio sounds in response to the audio frequency signals, these headphones being coupled to the radio receiving unit by a conducting cable. In particular, the radio receiving unit is comprised of a front end including a radio frequency (RF) stage 1, and a signal processing stage, including an intermediate frequency (IF) stage 2 and demodulating circuitry 3. In the preferred embodiment, the demodulating circuitry is comprised of a stereophonic demodulator adapted to produce left-channel and right-channel audio frequency signals in response to the RF signal that is received by RF stage 1 and processed by IF stage 2. Although not shown in FIG. 1, it may be appreciated that RF stage 1 also includes a local oscillator so as to be tunable to various broadcast frequencies, as desired.

The left-channel and right-channel audio signals which are demodulated by stereo demodulator 3 are coupled to audio frequency amplifiers 4 and 5, respectively. These audio frequency signals are coupled by a connection arrangement, to be described, to conducting leads 12 which, in turn, transmit the separate left-channel and right-channel audio signals to headphones 11. The headphones may be conventional and serve to produce separate left-channel and right-channel audio sounds that are perceived by a user of such headphones.

The connection arrangement between the radio receiving unit and headphone cable 12 is comprised of a jack 7 and a plug connector (hereinafter, merely plug) 13. Jack 7 includes a pair of movable contacts 7a and 7b and a fixed contact 7c. Plug 13, which is shown in greater detail in FIG. 3, comprises a typical phonoplug, such as a so-called mini-plug, which includes a shaft divided into separate conductive portions, the shaft being insertable into jack 7 so as to be brought into contact with movable contacts 7a and 7b in conventional manner. That is, separate conductive portions of the shaft of plug 13 are electrically connected to respective ones of movable contacts 7a and 7b. Yet another conductive portion of the shaft of plug 13 is brought into electrical connection with fixed contact 7c.

As shown in FIG. 1, inductive elements 6 and 8, such as inductances, couple audio amplifiers 4 and 5 to movable contacts 7a and 7b, respectively. Such inductances may be, for example, "micro-inductors", that is, inductors of very small physical size. Fixed contact 7c is coupled to a reference potential, such as ground, by an impedance 9. Preferably, impedance 9 also is an inductive element which presents a relatively high impedance to signals of radio frequency. Inductance 9 also may be a micro-inductor.

As will be explained below, radio signals, such as RF signals, are picked up by headphone cable 12, are coupled to fixed contact 7c of jack 7 by plug 13, and these RF signals then are supplied to the input of RF stage 1. A capacitor 10 provides a high frequency connection for these RF signals to be supplied to the input of the RF stage. Thus, radio signals which are broadcasted are picked up by cable 12, which functions as an antenna, and these picked up radio signals are supplied to the input of RF stage 1 such that the radio receiving unit may be tuned to an appropriate broadcast transmission frequency, whereby such RF signals then may be processed to produce the aforementioned left-channel and right-channel stereophonic audio signals. These audio signals are coupled from the radio receiving unit via jack 7 and plug 13 to headphone cable 12, and thence to headphones 11 whereat they are transduced to corresponding audio sounds.

Figure 3:
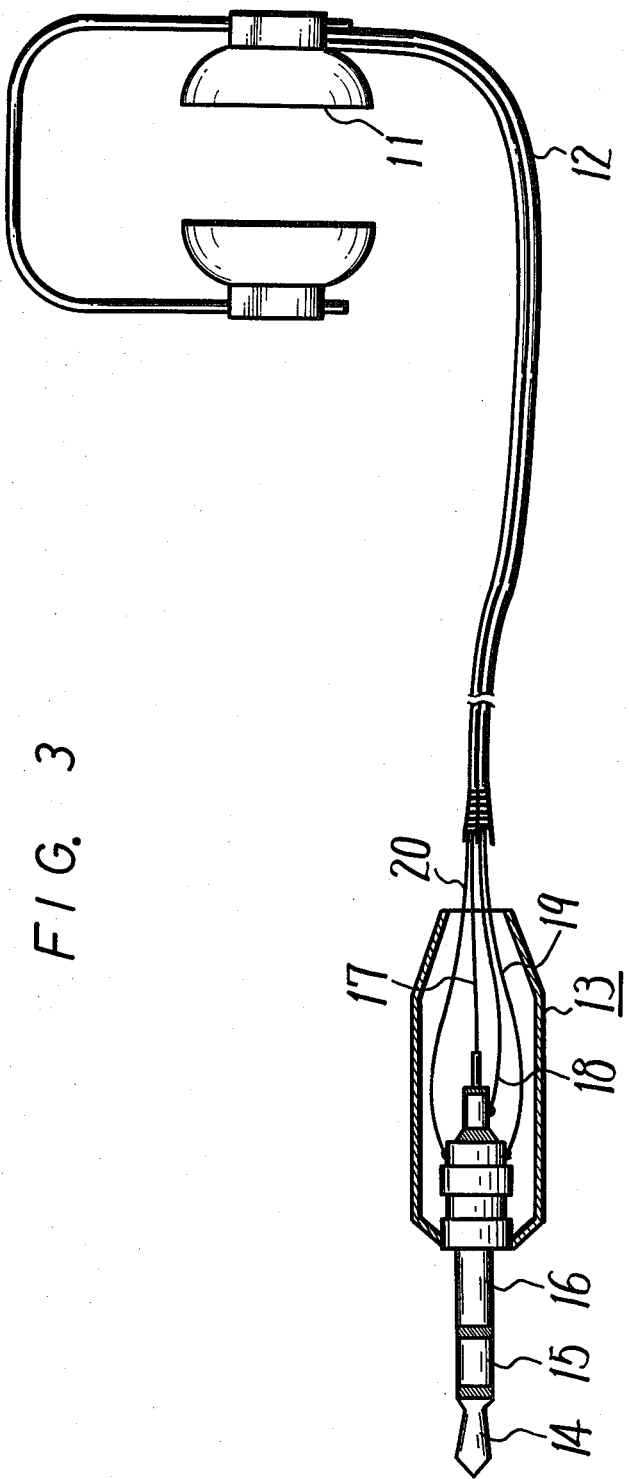
FIG. 3 is a partial cross-sectional view of the plug which is used with the present invention to connect headphones to a receiving unit.

Referring now to FIG. 3, there is illustrated a partial cross-sectional view of a preferred embodiment of plug 13. FIG. 3 also illustrates headphone cable 12 as being comprised of a pair of conducting leads, each conducting lead serving to supply a respective one of the left-channel or right-channel audio signals to one or the other of headphones 11. Each conducting lead is comprised of a signal-carrying lead 17, 18, and also a shield lead 20, 19, disposed in shielding relationship with respect to signal-carrying leads 17 and 18, respectively. For example, shield lead 20 may peripherally surround, and thus shield, signal-carrying lead 17. That is, signal-carrying lead 17 and shield lead 20 may be coaxial, with the signal-carrying lead being the inner lead. Likewise, shield lead 19 peripherally surrounds, and thus shields, signal-carrying lead 18. It is appreciated, therefore, that the surrounded signal-carrying leads 17 and 18 are shielded from interfering RF signals such that the audio frequency signals which are transmitted by these signal-carrying leads are not distorted.

Plug 13 is comprised of a tip 14, a ring 15 and a sleeve 16, each of which is conductive, and each is electrically isolated from the others. Tip 14 is electrically connected to signal-carrying lead 17, and ring 15 is electrically connected to signal-carrying lead 18. Finally, sleeve 16 is electrically connected to shield leads 19 and 20, both of which are connected to a common electrical connection, as illustrated.

It is appreciated that, when plug 13 is inserted into jack 7, tip 14 and ring 15 are brought into electrical connection with movable contacts 7a and 7b, respectively, and sleeve 16 is brought into electrical connection with fixed contact 7c, as illustrated in FIG. 1. Thus, the audio signal produced at the output of audio amplifier 4 is coupled by inductance 6, movable contact 7a and tip 14 to signal-carrying lead 17. Likewise, the audio signal produced at the output of amplifier 5 is coupled by inductance 8 to movable contact 7b and ring 15 to signal-carrying lead 18. Consequently, the audio signals which are derived from the RF signal supplied to RF stage 1 are coupled from the radio receiving unit to signal-carrying leads 17 and 18 which, in turn, transmit these audio signals to headphones 11.

Although not specifically shown in FIG. 3, signal-carrying leads 17 and 18 are covered by insulating material; and shield leads 20 and 19 then surround this insulating material so as to shield the signal-carrying leads from RF interference. Furthermore, this shielding prevents undesired cross-talk interference between the audio signals which are transmitted on signal-carrying leads 17 and 18.

In addition to shielding the signal-carrying leads, shield leads 19 and 20 operate to pick up broadcasted RF signals. These picked up signals are supplied by shield leads 19 and 20 to sleeve 16, from which they are coupled to fixed contact 7c of plug 7, and thence, coupled to RF stage 1 by capacitor 10. Inductance 9 presents a high impedance to these RF signals, thereby preventing such RF signals from flowing through the receiver ground. Because of the high impedance presented by inductance 9, it is appreciated that shield leads 19 and 20 are not connected to ground. Rather, these shield leads are electrically floating with respect to ground. Furthermore, even if there is some coupling of the RF signals from shield leads 19 and 20 to the signal-carrying leads due to stray capacitance therebetween, such stray-capacitance coupled RF signals are inhibited from flowing to the low impedance output of audio amplifiers 4 and 5 because of the presence of inductances 6 and 8, which inductances also present a relatively high impedance to these RF signals. Inductances 6 and 8 further serve to block any stray-capacitance-coupled RF signals from flowing in the radio receiver ground. Thus, headphone cable 12 is seen to be "electrically floating" from ground and, therefore, functions advantageously as an antenna to pick up RF signals and couple same to RF stage 1 of the radio receiving unit.

It is preferred to dispose shield leads 20 and 19 around signal-carrying leads 17 and 18, respectively, so as to reduce the radiation sensitivity of the signal-carrying leads. That is, it is preferred that the function of an antenna be performed by the shield leads and not by the signal-carrying leads. This permits the signal-carrying leads to transmit audio audio frequency signals with minimal cross-talk interference and RF interference, while enabling the shield leads to pick up and supply broadcasted RF signals to the radio receiving unit.

In one embodiment, the radio receiving unit is adapted to receive, process and demodulate FM signals. Hence, IF stage 2 produces an IF FM signal having the usual intermediate frequency of 10.7 MHz. It is this IF signal which is demodulated by stereo demodulator 3, the left and right channel audio outputs of which are amplified by audio amplifiers 4 and 5, and supplied to plug 13, as described above.

Figure 2:
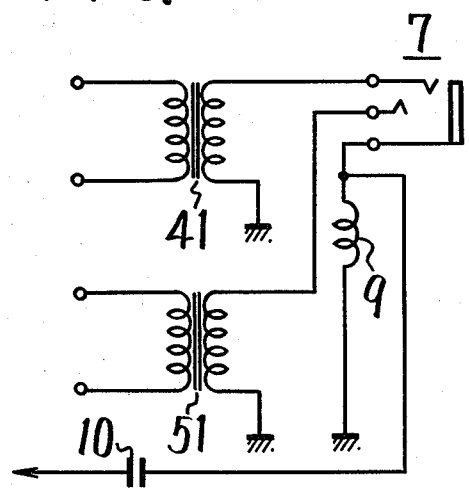
FIG. 2 is a schematic diagram of an alternative embodiment of a portion of the apparatus shown in FIG. 1.

FIG. 2 illustrates an alternative embodiment by which amplifiers 4 and 5 are coupled to movable contacts 7a and 7b, respectively, of jack 7. In particular, inductances 6 and 8 are replaced by coupling transformers 41 and 51, respectively. The primary winding of each coupling transformer is connected to its respective audio amplifier, and the secondary winding thereof is coupled to a respective movable contact of jack 7. In the embodiment shown in FIG. 2, each secondary winding is coupled at one end thereof to ground, and is coupled at its other end to a respective contact of the jack.

In the embodiments shown in FIGS. 1 and 2, the radio receiver ground potential may be thought of as negative (−) ground. The present invention may be readily adapted for use with headphones 11 which are provided with, for example, positive (+) ground. With such positive ground, inductance 9 may be coupled between fixed contact 7c of jack 7 and the positive terminal of the usual power supply that may be used with the apparatus.

Thus, it is seen that, in accordance with the present invention, a relatively simple radio receiving apparatus is provided, wherein the cable that is used to connect headphones to a receiving unit also functions as an antenna. This eliminates the need to provide additional antenna structures, such as the rod-antenna which heretofore had been employed. Rather, merely by inserting plug 13 into jack 7, the user of the illustrated apparatus connects a suitable antenna to the radio receiver. The problem of directivity, which is associated with typical rod-antennae, thus is avoided.

While the present invention has been particularly shown and described with reference to certain preferred embodiments, it will be readily appreciated by those of ordinary skill in the art that various changes and modifications in form and details may be made without departing from the spirit and scope of the invention. For example, the radio receiving apparatus need not necessarily be limited solely to stereophonic apparatus. Rather, monophonic signals may be picked up and processed, such monophonic signals being either FM or AM broadcasted transmissions. If monophonic signals are processed, it is appreciated that stereo demodulator 3 may be replaced by a conventional AM or FM demodulator, and that only a single audio amplifier need be used. Furthermore, since only a single audio channel is demodulated, plug 13 need be provided with only two conductive portions, one of which being connected to a signal-carrying lead and the other of which being connected to the shield lead. Of course, the conductive portion that is connected to the signal-carrying lead will, when plug 13 is inserted into jack 7, be coupled via a suitable jack contact to the output of the audio amplifier. Also, the shield lead will be coupled via the other conductive portion of plug 13 to that contact of the jack which, in turn, is connected to the high RF impedance presented by inductance 9.

It is, therefore, intended that the appended claims be interpreted as including the foregoing as well as other such changes and modifications.

What is claimed is:

1. Radio receiving apparatus comprising a radio frequency (RF) stage supplied with an RF signal; signal processing means coupled to said RF stage to produce an audio frequency signal in response to the RF signal supplied to said RF stage; a jack having at least first and second contacts; means for supplying said audio frequency signal produced by said signal processing means to said first contact of said jack; impedance means coupled between said second contact of said jack and a reference potential, said impedance means presenting a relatively high impedance to an RF signal; plug means insertable into said jack and having at least two conductive portions connected to said first and second contacts, respectively, of said jack; headphone means for reproducing audio sounds in response to said audio frequency signal; conducting leads for connecting said headphone means to said plug means and including at least one signal carrying lead connected to the conductive portion of said plug means that is, in turn, connected to said first contact of said jack and at least one shield lead disposed in shielding relationship with respect to said signal carrying lead and connected to the other conductive portion of said plug means; and means for coupling said second contact of said jack to said RF stage to supply to said RF stage RF signals picked up by said shield lead.

2. The apparatus of claim 1 wherein said impedance means comprises inductance means; and wherein said shield lead is electrically floating with respect to said reference potential.

3. The apparatus of claim 1 wherein said means for supplying said audio frequency signal to said first contact of said jack comprises inductance means.

4. The apparatus of claim 3 wherein said signal processing means includes an amplifier output stage, the output of said amplifier output stage being coupled to said first contact of said jack by said inductance means, whereby the RF signals picked up by said shield lead are inhibited from being coupled to said amplifier output stage.

5. The apparatus of claim 3 wherein said inductance means comprises a transformer having a primary winding coupled to said signal processing means and a secondary winding coupled to said first contact of said jack.

6. The apparatus of claim 1 wherein said at least two conductive portions of said plug means are electrically isolated from each other.

7. The apparatus of claim 1 wherein said signal processing means includes stereo signal producing means for producing left and right channel audio signals; said jack includes a pair of movable contacts supplied with said left and right channel audio signals, respectively, and a fixed contact; said plug means includes tip and ring conductive portions connectable to respective ones of said movable contacts, and a sleeve portion connectable to said fixed contact; and said conducting lead includes a pair of signal carrying leads electrically connected to respective ones of said tip and ring conductive portions for carrying said left and right channel audio signals, respectively, and a pair of shield leads both electrically connected to said sleeve portion.

8. The apparatus of claim 7 wherein said shield leads surround respective ones of said signal carrying leads.

9. The apparatus of claim 7 wherein said means for coupling said second contact of said jack to said RF stage comprises a coupling capacitor connected between said fixed contact of said jack and the input of said RF stage.

10. Stereophonic signal receiving apparatus of the type having a receiving unit including an RF stage for receiving radio signals and a demodulating stage for demodulating stereo left and right channel audio signals therefrom, and stereo headphones coupled to said receiving unit by conducting leads to reproduce audio signals in response to said left and right channel audio signals demodulated by said receiving unit, the improvement wherein said conducting leads function as a radio signal antenna to pick up radio signals and couple same to said receiving unit, and comprising a jack having a pair of movable contacts and a fixed contact; signal coupling means for coupling said left and right channel audio signals to respective ones of said movable contacts; impedance means for coupling said fixed contact to ground potential, said impedance means exhibiting a relatively high impedance to RF signals; a plug connectable to said jack and having at least three conductive portions adapted to be connected to respective ones of said jack contacts; a pair of signal carrying leads and shielding means included in said conducting leads, said signal carrying leads being connected between said stereo headphones and those two of said conductive portions of said plug which are adapted to be connected to said movable contacts of said jack, and said shielding means being connected to the third of said conductive portions of said plug which is adapted to be connected to the fixed contact of said jack; and means for coupling the radio signals picked up by said shielding means to said RF stage of said receiving unit from said fixed contact of said jack.

11. The improvement of claim 10 wherein said means for coupling the radio signals picked up by said shielding means to said RF stage comprises a coupling capacitor.

12. The improvement of claim 11 wherein said impedance means comprises inductance means, whereby said shielding means is electrically floating with respect to ground potential.

13. The improvement of claim 12 wherein said signal coupling means comprises respective inductor elements to block radio signals which may be picked up by said signal carrying leads from interfering with the signals processed by said receiving unit.

14. The improvement of claim 13 wherein said respective inductor elements comprise respective coupling transformers for coupling the left and right channel audio signals to respective ones of said movable contacts of said jack.

15. The improvement of claim 13 wherein said shielding means comprises at least one shielding lead peripherally surrounding said signal carrying leads.

16. The improvement of claim 15 wherein said conductive portions of said plug comprise tip, ring and sleeve portions, respectively, said tip and ring portions being connectable to movable contacts of said jack and said sleeve portion being connectable to the fixed contact of said jack.

* * * * *